US007933591B2

(12) United States Patent
Blom et al.

(10) Patent No.: US 7,933,591 B2
(45) Date of Patent: Apr. 26, 2011

(54) SECURITY IN A MOBILE COMMUNICATIONS SYSTEM

(75) Inventors: Rolf Blom, Jarfalla (SE); Mats Naslund, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1174 days.

(21) Appl. No.: 11/570,186

(22) PCT Filed: May 17, 2005

(86) PCT No.: PCT/SE2005/000716
§ 371 (c)(1),
(2), (4) Date: Dec. 7, 2006

(87) PCT Pub. No.: WO2005/125261
PCT Pub. Date: Dec. 29, 2005

(65) Prior Publication Data
US 2007/0157022 A1 Jul. 5, 2007

(51) Int. Cl.
*H04W 88/02* (2009.01)
(52) U.S. Cl. ........................................ 455/419; 455/410
(58) Field of Classification Search .................. 455/410, 455/411, 414.2, 419, 518; 713/156, 166, 713/176, 189, 150; 380/278, 328; 726/25; 370/352
See application file for complete search history.

(56) References Cited

U.S. PATENT DOCUMENTS

| | | | |
|---|---|---|---|
| 6,788,676 B2 * | 9/2004 | Partanen et al. | 370/352 |
| 7,443,839 B2 * | 10/2008 | Bouthemy et al. | 370/352 |
| 2005/0120198 A1 * | 6/2005 | Bajko et al. | 713/150 |
| 2007/0021138 A1 * | 1/2007 | Allen et al. | 455/518 |
| 2007/0054686 A1 * | 3/2007 | Allen et al. | 455/518 |
| 2008/0064369 A1 * | 3/2008 | Xie et al. | 455/411 |

(Continued)

FOREIGN PATENT DOCUMENTS

WO WO 2004/032557 4/2004

OTHER PUBLICATIONS

"Universal Mobile Telecommunications System (UMTS): SIM/USIM internal and external interworking aspects (3GPP TR 31.900 version 5.4.0 Release 5); ETSI TR 131 900" ETSI Standards, European Telecommunications Standards Institute, Sophia-Antipo, FR, vol. 3-T3, No. V540, Dec. 2003, XP014015780 ISSN: 0000-0001.

(Continued)

*Primary Examiner* — Diane Mizrahi

(57) ABSTRACT

When a mobile terminal (10), having a basic identity module (12) operative according to a first security standard, initiates a service access, the home network (30) determines whether the mobile terminal has an executable program (14) configured to interact with the basic identity module for emulating an identity module according to the second security standard. If it is concluded that the mobile terminal has such an executable program, a security algorithm is executed at the home network (30) to provide security data according to the second security standard. At least part of these security data are then transferred, transparently to a visited network (20), to the mobile terminal (10). On the mobile terminal side, the executable program (14) is executed for emulating an identity module according to the second security standard using at least part of the transferred security data as input. Preferably, the first security standard corresponds to a 2G standard, basically the GSM standard and the second security standard at least in part corresponds to a 3G standard such as the UMTS standard, and/or the IP Multimedia Sub-system (IMS) standard.

5 Claims, 13 Drawing Sheets

U.S. PATENT DOCUMENTS

2010/0177769 A1* 7/2010 Barriga et al. ............... 370/352

OTHER PUBLICATIONS

International Search Report from European Patent Office, issued Aug. 29, 2005 for PCT/SE2005/00716.

Barkan, Biriam, and Keller, "Instant ciphertext-only cryptanalysis of GSM encrypted communication", in proceedings of Crypto 2003, Lecture notes in computer science. Springer-Verlag.

"Enhancements to GSM/UMTS AKA", 3GPP contribution S3-030542, 3GPP TSG SA WG3 Security, Oct. 2003.

"Special Rand" 3GPP contribution S3-030588, 3GPP TSG SA WG3 Security. Oct. 2003.

3GPP TR 31.900 V3 2.0 (Mar. 2002) Technical Report, Technical Specification Group Terminals, "SIM/USIM Internal and External Interworking Aspects" (Release 1999).

3GPP TS 35.206 V4.0.0 (Apr. 2001) Technical Specification Group Services and System Aspects.

* cited by examiner

SECURITY IN A MOBILE COMMUNICATIONS SYSTEM

TECHNICAL FIELD OF THE INVENTION

The present invention generally relates to security issues in a mobile communications system.

BACKGROUND OF THE INVENTION

In mobile communication, e.g. according to the GSM (more generally referred to as 2G) or UMTS (more generally referred to as 3G) standard, security has become of utmost importance. This is very much related to the increased use of mobile communication in business and for private communication. Accordingly, requirements on security encompass authentication of network as well as of mobile user, integrity of information transmitted over a mobile link, encryption of information and protection against replay attacks. It is for example known that GSM suffers from security problems and, e.g., it is possible to retrieve the encryption key by breaking the A5/2 cryptographic algorithm. A technical description of a fraudulent proceeding is described in reference [1]. The GSM authentication and key agreement procedure AKA is only dependent on a random number RAND and the key is thus the same independent of the actual crypto algorithm used. There are three algorithm choices for circuit switched data, A5/1, A5/2, A5/3 and three algorithms for packet data, GEA1, GEA2 and GEA3. The terminal signals its capabilities, in particular the set of crypto algorithms it supports, to the network. The network then selects which crypto algorithm to use. Note that this signalling is unprotected. Thus the terminal has no chance to detect if and when an attacker is signalling that it should use A5/2 and that this information originates from a legitimate operator.

Generally, there are three types of attacks. The first type comprises an attacker intercepting and decrypting traffic when the system is using A5/2 that has been broken as described in reference [1].

The second type comprises interception of traffic associated with the AKA procedure to record traffic data and the RAND-value that is used. Later, a false base station can make the mobile terminal execute an AKA procedure using the previously recorded RAND and to encrypt the traffic using the A5/2-algorithm, which enables the attacker to retrieve the crypto key $K_C$. Due to the simple dependence on RAND this key, $K_C$, will be the same key as was used to protect the recorded traffic.

The third type of attack involves an active man-in-the-middle forcing the terminal to use the A5/2 algorithm, thereby enabling calculation of the crypto key.

The UMTS standard advises methods that overcome most of these problems. However, a scenario is foreseen in which GSM terminals will be used during a considerable period of time until UMTS terminals have become property of the great majority of users. In fact, many advanced services will be available on GSM phones and users may be reluctant to exchange their phones until at a later time. Some solutions to these problems are currently being proposed in 3GPP, e.g. as described in references [2, 3]. Reference [2] discloses a solution to enhance the security provided by GSM AKA by deriving transform dependent keys, also referred to as key-separation. While this solution solves some of the GSM problems there are still disadvantages. For instance, this solution does not provide a signalling interface that is appropriate for UMTS AKA, which would be preferred in order to get replay protection, network authentication, and secure algorithm selection. This solution also, in some cases, becomes complex. The solution disclosed in reference [3] suffers from the same disadvantages and, in addition, has some other security problems in that the effective key-space size is potentially reduced due to reduced randomness. Still other disadvantages relate to a reduced randomness of the RAND and there is, furthermore, no provision for mutual authentication Still another method to improve the GSM AIA security is described in reference [4] and referred to as EAP-SIM (Extensible Authentication Protocol). The main part of EAP-SIM comprises a mutual authentication and session key agreement protocol. According to this method, up to three GSM AKA triplets are generated and included in security operations to achieve a longer session key, e.g. 128 bits. The improved security requires certain conditions to be fulfilled regarding the choice of RAND-values. A disadvantage of this method is that sessions are not independent. If the session key from one of the sessions is compromised then an adversary can use it to carry fraudulent conversations with the client. Another disadvantage is that a mobile terminal, provided with EAP SIM functionality, does not behave as an ordinary GSM terminal towards the network but requires a special communication protocol. EAP SIM could therefore not be made transparent to GSM/UMTS access networks.

Reference [6] describes a tamper-resistant security device such as a SIM card, which in addition to the AKA module has a software application that cooperates with the AKA module to provide security and/or privacy enhancements such as those proposed by EAP-SIM.

SUMMARY OF THE INVENTION

It is a general object of the invention to provide an improved security method and system in a mobile communications system. It is a specific object to provide a management system and mobile terminal in support thereof.

It is an object of the invention to provide a method and arrangement to improve security in a communications system currently supporting a basic security standard.

It is a special object to implement support for improved security by providing a terminal with executable software that interacts with an identity module for re-use of executable security routines therein that only supports a basic security standard.

It is also an object of the invention to provide mutual authentication of a mobile terminal and the network.

Another object of the invention is to provide for replay protection.

Still another object of the invention is to provide some integrity protection of information exchanged between a terminal and the network related to the selection of a security algorithm.

It is a main object of the invention to provide support for security agreements between the network side and the terminal side according to both a first and a second security standard in a mobile communications system serving at least some mobile terminals that have an identity module supporting only the first security standard.

In particular, when the mobile terminals have a SIM according to a 2G standard such as the GSM standard, it is desirable to provide support for a security standard that at least in part corresponds to a 3G standard such as the UMTS standard, and/or a security standard at least partly corresponding to IP Multimedia Sub-systems.

Hence, it is a special object to implement in a GSM system certain security features characteristic of a UMTS system.

For the particular example of GSM, there is a need for a method and arrangement that improves the GSM security and provides at least some characteristics of a UMTS system without requiring a special identity module such as a USIM card in a GSM terminal when authenticating towards the network.

These and other objects are obtained by the invention according to the attached claims.

Briefly, the invention relates to security in a mobile communications system having a home network that provides support for a first security standard and a second security standard, and where the mobile communications system serves one or more mobile terminals having an identity module operative according to a first security standard. When a mobile terminal initiates a service access, the home network determines whether the mobile terminal has an executable program configured to interact with the identity module of the mobile terminal for emulating an identity module according to the second security standard. If it is concluded that the mobile terminal has such an executable program, a security algorithm is executed at the home network to provide security data according to the second security standard. At least part of these security data of the second security standard are then transferred, transparently to a visited network, to the mobile terminal. On the mobile terminal side, the executable program, which is configured to interact with the mobile terminal's identity module, is executed for emulating an identity module according to the second security standard using at least part of the transferred security data as input.

Preferably, the first security standard corresponds to a 2G standard, basically the GSM standard and the second security standard at least in part corresponds to a 3G standard such as the UMTS standard, and/or the IP Multimedia Sub-system (IMS) standard.

When the UMTS security standard is the objective, the inventive program is typically configured for emulating a USIM (UMTS Subscriber Identity Module) by the GSM SIM to enable access to the basic network service. On the other hand, in the context of IP Multimedia Sub-systems, the program is preferably configured for emulating an ISIM (IP Multimedia SIM) by the GSM SIM to enable access to IP Multimedia Sub-system services. It can be noted that an ISIM generally provides support for access on the application level. It should also be understood that there is nothing that prevents one and the same SIM to be re-used for emulating both a USIM and an ISIM.

Normally, the mobile terminals are provisioned with the new software program during an initial phase, and the provisioning is registered in a so-called device capability register. When the home network determines whether a requesting mobile terminal is upgraded with the new software, the home network preferably interrogates the device capability register to decide which security algorithm to use for the security calculations. The provisioning may for example be performed over the air or at a resale station. Preferably, however, the provisioning is performed by a device management system of the mobile communications system, especially when the invention is implemented in IP Multimedia Sub-systems.

Preferably, the emulated identity module is operable for calculating security data for mutual authentication and at least one security key corresponding to the Milenage algorithm or similar standardized security algorithm. Advantageously, the emulated identity module is also configured for providing replay protection based on at least part of the transferred security data.

For improved security at the terminal side, the emulation is typically, although not necessary, enabled only after verification of an enabling code. If this optional feature is used, it may be beneficial to store the enabling code in the identity module of the mobile terminal during provisioning. The executable program, for example, may then be configured for verifying the enabling code before allowing interaction between the supplied software and the existing identity module.

BRIEF DESCRIPTION OF DRAWINGS

The following description is preferably made with reference to accompanying figures in which.

DESCRIPTION OF ILLUSTRATIVE EMBODIMENTS

The invention will now be described in more detail by way of examples that shall not be held restrictive of the scope of the invention and from which a skilled person shall be able to derive alternative advantageous embodiments.

Figure 1:
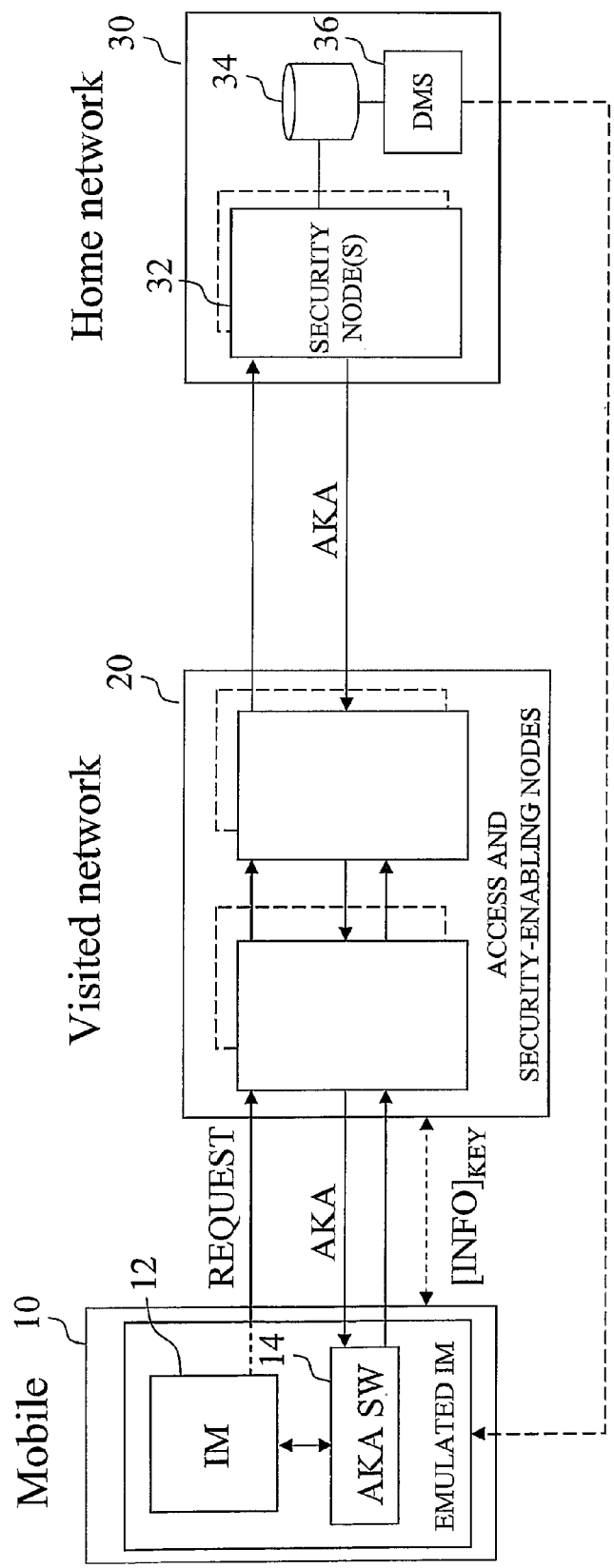
FIG. 1 is a schematic diagram outlining the features of the invention according to an exemplary embodiment of the invention.

FIG. 1 is a schematic diagram outlining the features of the invention according to an exemplary embodiment of the invention. The overall mobile communications system, which serves at least one mobile terminal 10, basically comprises a combination of visited network 20 and home network 30. The visited network 20 usually comprises one or more access and security-enabling nodes adapted for the considered communication system and application. Basically, the visited network 20 has to provide support for user authentication, in which mobile terminals authenticate towards the network in order to gain access to the requested services. This authentication may also serve as a base for billing the users. The basic security protocols of modern communication systems normally involve a challenge-response authentication and key agreement (AKA) procedure. The AKA procedure is most often based on symmetric cryptography using a secret key shared between the mobile terminal 10 and the home network 30. In the home network one or more security nodes 32, also called subscriber-handling network nodes, handles the subscribers and related security information via interaction with one or more registers and databases 34. The subscriber-handling node(s) of the home network communicates with the access and security-enabling node(s) in the visited network, usually transferring AKA-related information and optionally also security policy information from the home network 30 to the visited network 20.

The security-enabling network nodes in the visited network and the subscriber-handling nodes in the home network may for example be related to the basic network access service, and then include nodes such as the BSS nodes and MSC/VLR/SGSN in the visited network and HLR/AuC in the home network. However, there may also be corresponding network nodes on the "application level", for example the proxy CSCF (Call State Control Function) node in the visited network, and the corresponding CSCF node(s) as well as the HSS (Home Subscriber System) node in the home network for IP Multimedia Services, as indicated by the dashed boxes in FIG. 1.

The mobile terminal 10 has an identity module (IM) 12 operative according to a first security standard, and is also provisioned with a software upgrade in the form of an executable AKA software program 14 that is configured to interact with the identity module 12 of the mobile terminal for emulating an identity module according to a second security standard. Typically, the mobile terminal 10 is provisioned with the new software program during an initial phase, and the provisioning is registered in a so-called device capability register. This register is preferably implemented in connection with the home network, and is normally associated with a so-called device management system (DMS) 36. The provisioning may for example be performed over the air or at a resale station. Preferably, however, the provisioning is performed by the device management system 36 of the mobile communications system, especially when the invention is implemented in IP Multimedia Sub-systems.

When a mobile terminal initiates a service access such as basic network access and/or access to an application service, it sends a request to the visited network, which relays the request to the home network. The home network first determines whether the mobile terminal really has been upgraded with the new software program 14. This is preferably done by interrogating one or more registers 34 including the device capability register. Alternatively, the home network security node(s) 32 may be updated to maintain local information of the device capability of users. If it is determined by the home network 30 that the mobile terminal 10 has the required software program, a security algorithm is executed at the home network to provide security data according to the second security standard. The calculations may be performed by a customized hardware module provided in the home network. Alternatively, the relevant network node in the home network is upgraded with a software program that interacts with the existing security module to emulate the security algorithm according to the second standard, especially if there is hardware support for AKA functions according to the first security standard. At least part of these calculated security data are then transferred to the mobile terminal in a manner substantially transparently to the visited network so that the signalling interface does not have to be changed. On the mobile terminal side, the executable program, which is configured to interact with the mobile terminal's identity module, is executed for emulating an identity module according to the second security standard using at least part of the transferred security data as input.

Preferably, the first security standard corresponds to a 2G standard, basically the GSM standard, and the second security standard at least in part corresponds to a 3G standard such as the UMTS standard, and/or the IP Multimedia Sub-system (IMS) standard. For more detailed definitions of 2G and 3G, reference is made to [5]. This normally implies (mutual) authentication, as well as key agreement for protecting information such as data (payload) or control signalling by one or more session keys.

When the UMTS security standard is the objective, the inventive program is typically configured for emulating a USIM (UMTS Subscriber Identity Module) by a GSM SIM to enable access to the basic network service. On the other hand, in the context of IP Multimedia Sub-systems, the program is preferably configured for emulating an ISIM (IP Multimedia SIM) by a GSM SIM to enable access to IP Multimedia Sub-system services. It should be understood that there is nothing that prevents one and the same SIM to be re-used for emulating both a USIM and an ISIM. The invention thus allows emulation of USIM, ISIM or a combination of both, as well as other, preferably enhanced, identity modules.

In the following, the invention will first mainly be described with reference to GSM and UMTS communication systems and later also with reference to the IP Multimedia Sub-system, but it should be understood, as indicated above, that the invention in its most general form is concerned with a first security standard and second security standard, and as an important special case a basic security standard and an improved security standard.

For a better understanding it may be useful to begin with an overview of security standards of prior art mobile communication systems such as GSM and UMTS.

Figure 2:
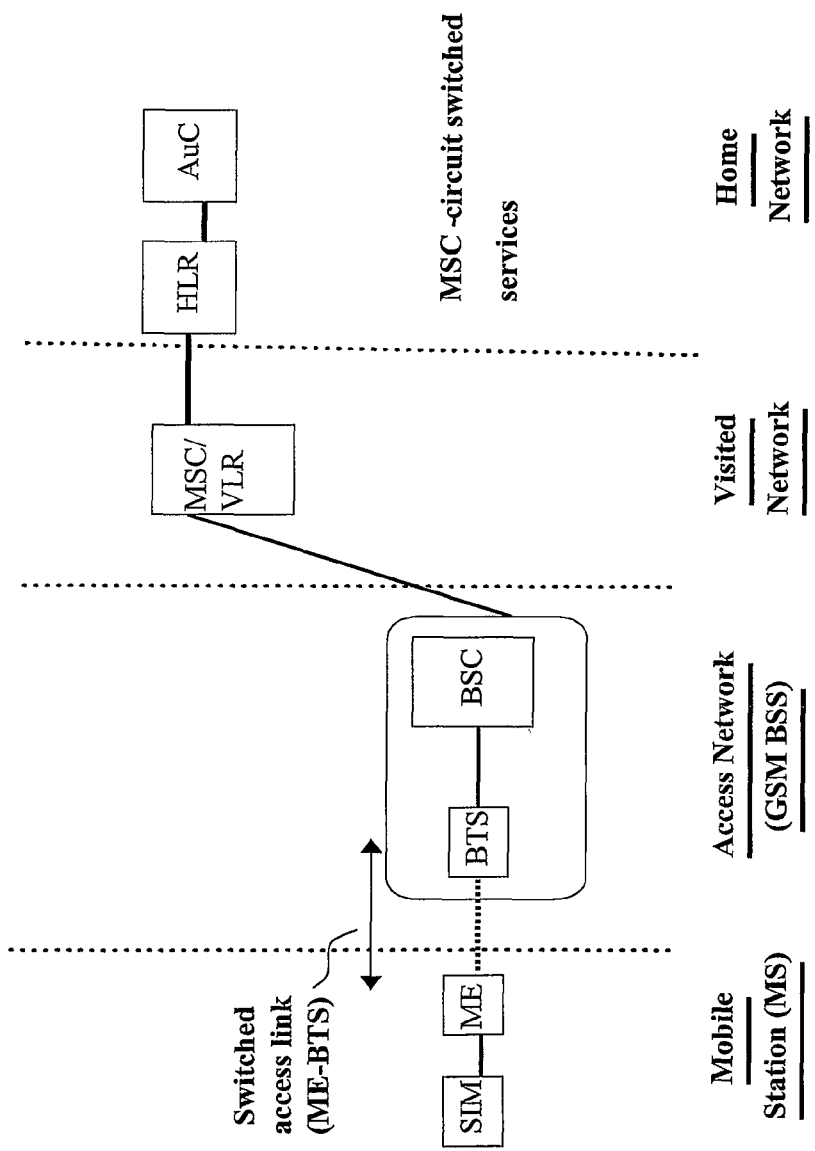
FIG. 2 shows schematically a prior art system for mobile communication.

FIG. 2 illustrates schematically a prior art system for mobile communication. A mobile station MS, e.g. a mobile phone, can connect to the network through an access network, for example a 2G (GSM) or 3G (UMTS) network. The access node may be a base transceiver station BTS in a GSM system or a radio base station RBS in a UMTS system. The access network connects to a mobile switching center MSC located in a switched network, for example a visited network. The MSC node also includes functions for setting up the radio connection between MSC and ME, e.g., establishing of security functions as will be explained further on. The MSC is linked to a visited location register VLR, often co-located with the MSC that stores user related data and performs security functions. Also shown in the figure is a HLR, Home Location Register located in the home network where the user usually has a subscription with the network operator. HLR stores user related data, e.g. subscription related data, and co-operates with the MSC/VLR to keep track of the location of MS. HLR is linked to an authentication centre AUC, often co-located with the HLR, that includes algorithms for calculation of security data. The AUC node stores a secret k that is also stored in an identity module at the MS. Exemplary the identity module can be a SIM card or a UICC card with a USIM application.

It is thus understood that a network node may be of at least two types related to e.g. a GSM system or a UMTS system. Combinations of these types may occur in a network although there are certain restrictions. However, the specification of any two systems, in order to interwork, should allow a mobile station of any of the two types to roam between any two such networks. In a first aspect of the invention, a GSM mobile station is assumed that roams in a GSM base station environment.

Figure 3:
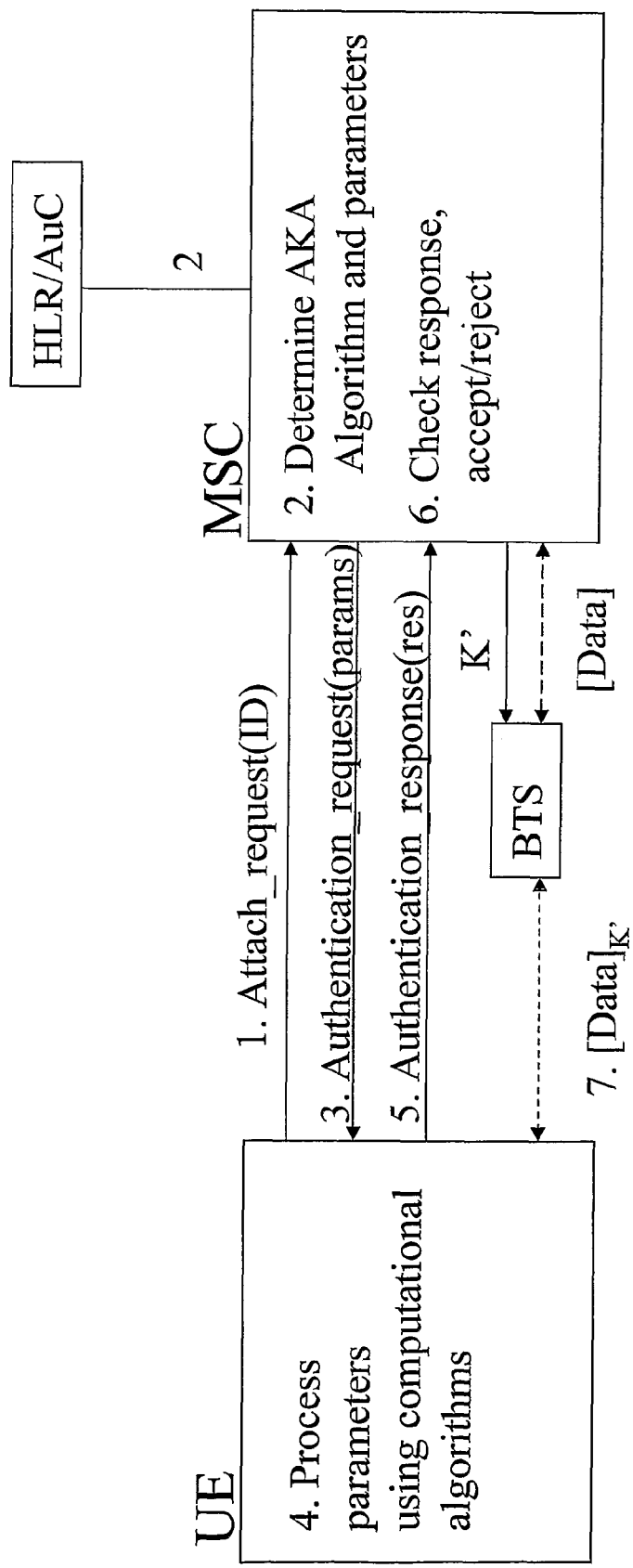
FIG. 3 illustrates a typical signal exchange for establishing a secure connection in a prior art system.

Referring now to FIG. 3, a signal flow chart is shown illustrating, by way of example, a conventional procedure to establish a network access. Not shown in FIG. 3 is the access node, e.g. BTS that, however, for this presentation can be overlooked because it simply forwards the messages to and from the MSC. A mobile station, MS, requests access to the network by transmitting, at step 1, a first attach request signal including a claimed MS identity, ID. The MSC node is requested, at step 2, to determine authentication and key agreement parameters, AKA. This is done in co-operation with the HLR and/or, in case of location update, with the previous MSC (not shown in the figure). At step 3, the MSC requests authentication data in a signal including at least some AKA parameters. The mobile station MS processes, at step 4, the received AKA parameters and determines an authentication response, which is transferred to the MSC at step 5. The MSC verifies the response at step 6 and, depending on the result, accepts or rejects the access request. At step 7 the data exchange commences according to security routines decided on in the authentication process. Exemplary, data is encrypted using a key K', e.g. the cipher key $K_C$ of a GSM system. The GSM system normally terminates encryption in the base transceiver node BTS where after data is forwarded in clear text to MSC for further switching. The processing step 4 may include authentication of the network as for example the case is in a UMTS system.

It is readily understood that the security established between a mobile station and the network will depend on the security capabilities of the mobile station MS and the security capabilities of the network nodes involved. The situation is complicated in that the network is developed to a large extent independently from the user community. Thus, operators update network nodes according to some plan whereas the user community acquires or replaces user equipment depending on market factors such as price and service availability. The shift from, e.g., GSM to UMTS represents a major step that will require a considerable time to complete. It is advantageous to find intermediate steps involving at least some features of the final goal, e.g. UMTS, to improve over a basic platform, e.g. GSM. In the following a detailed solution to this problem is presented according to a first aspect of the invention.

Although the invention will primarily be described with reference to the security standards of GSM and UMTS, it should be understood that the underlying principles of the invention are generally applicable to any pair of communication standards with a first (basic) security standard and a second (improved) security standard, in which an "identity module" is used.

Figures 4A, 4B:
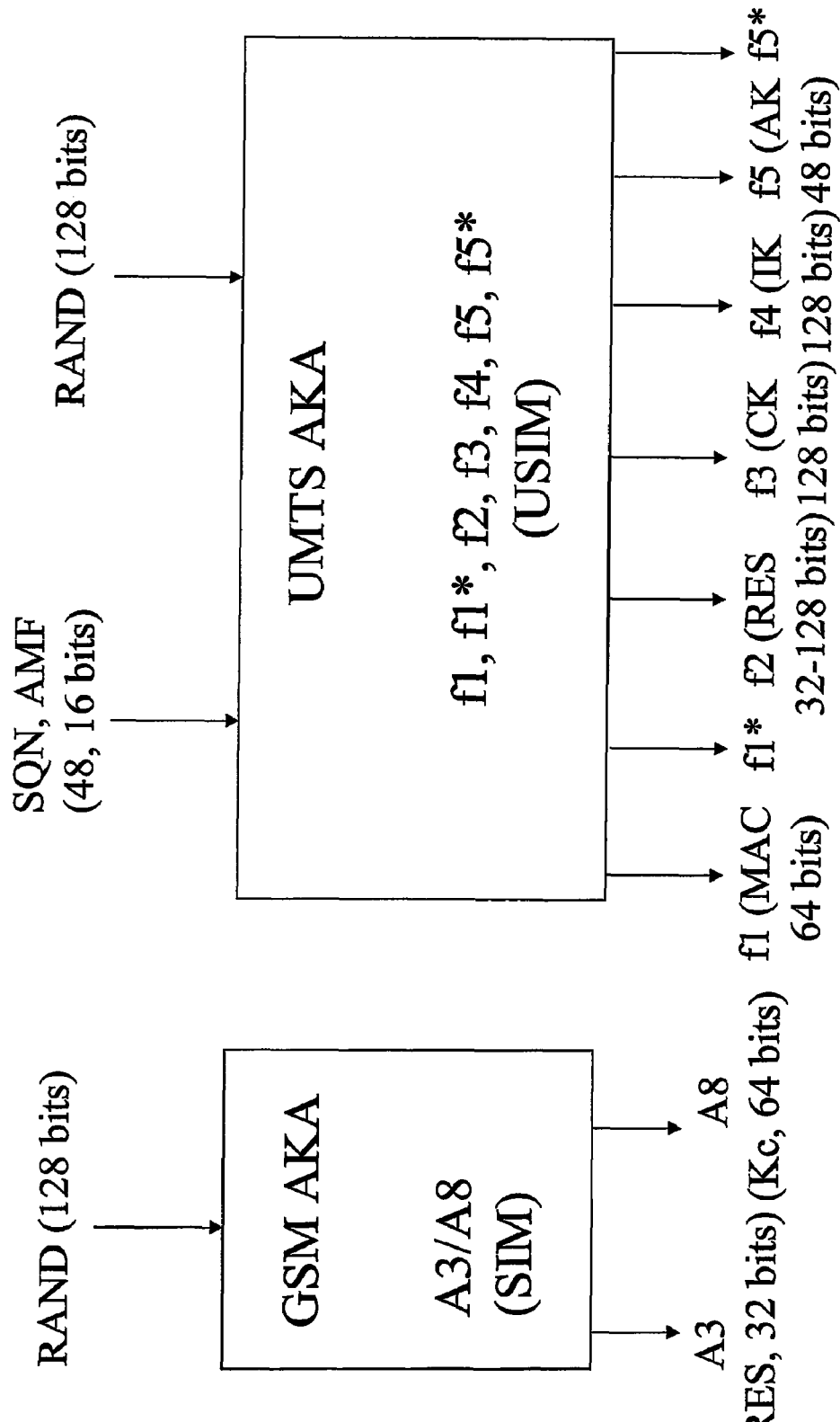
FIG. 4 shows, in principle, input to and output from prior art GSM and UMTS security algorithms, respectively.

Referring to FIG. 4, the basic functions for key generation according to the GSM standard and the UMTS standard, respectively, are schematically shown. Thus, in GSM, a random seed, RAND, is input to a SIM identity module implementing two algorithms referred to as A3 and A8. These algorithms generate respectively a response RES and a cipher key $K_C$. The lengths of these values are indicated in the figure and RES has, thus, 32 bits and $K_C$ has 64 bits. The UMTS case is more complicated and seven different values are output from the corresponding USIM identity module in a UMTS system.

Thus, the f2 algorithm generates the response RES and the f3 algorithm generates the cipher key generally denoted CK. The f1 algorithm is used for authentication of the network to the mobile station. The remaining parameters are used for integrity protection, IK, and anonymity protection, AK. Besides a random seed RAND, a sequence number SQN and AMF data referred to as the Authentication Management Field are input to the USIM identity module that implements the UMTS AKA algorithms. The AMF field is a 16 bit long field providing a general mechanism that can be used in various ways, i.e. it is up to the operator to specify use of this field.

Figure 5:
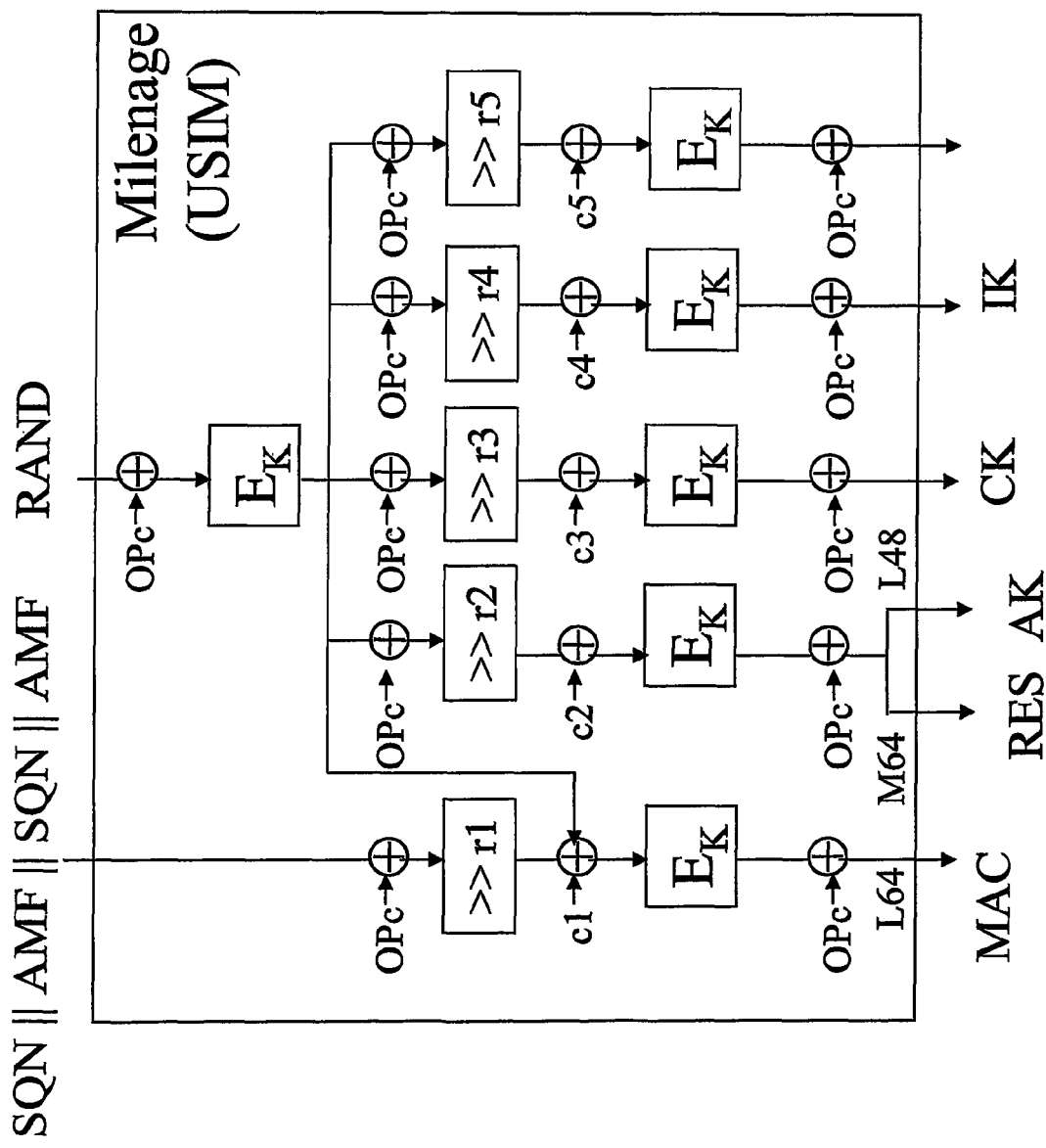
FIG. 5 illustrates in more detail a prior art UMTS security algorithm.

FIG. 5 shows in more detail an implementation of the UMTS AKA algorithm referred to as the Milenage algorithm, see reference [7]. In this figure concatenation of two strings is illustrated by the symbol "||". Further, the symbol "⊕" denotes the XOR operation and ">>" denotes rotation, i.e. a shift by a number of steps indicated by parameter r, e.g. r1. The denotation Lx means the least "x" significant bits and My means the most significant "y" bits of the indicated output. Further, parameters c1-c5 are included in the computations. Parameters r1-r5 and c1-c5 are stored at the mobile station (in the USIM) and determined in a configuration phase by the operator. The boxes denoted $E_K$ represent some encryption algorithm, e.g. the AES algorithm. Briefly, the output from the USIM card is explained as follows. The MAC value is used for verifying authenticity of the network. The RES value is the response allowing the network to authenticate the identity module. The parameter AK is referred to as the anonymity key and CK is the cipher key. Finally, IK is an integrity key used for protection of certain signal messages.

Figure 6:
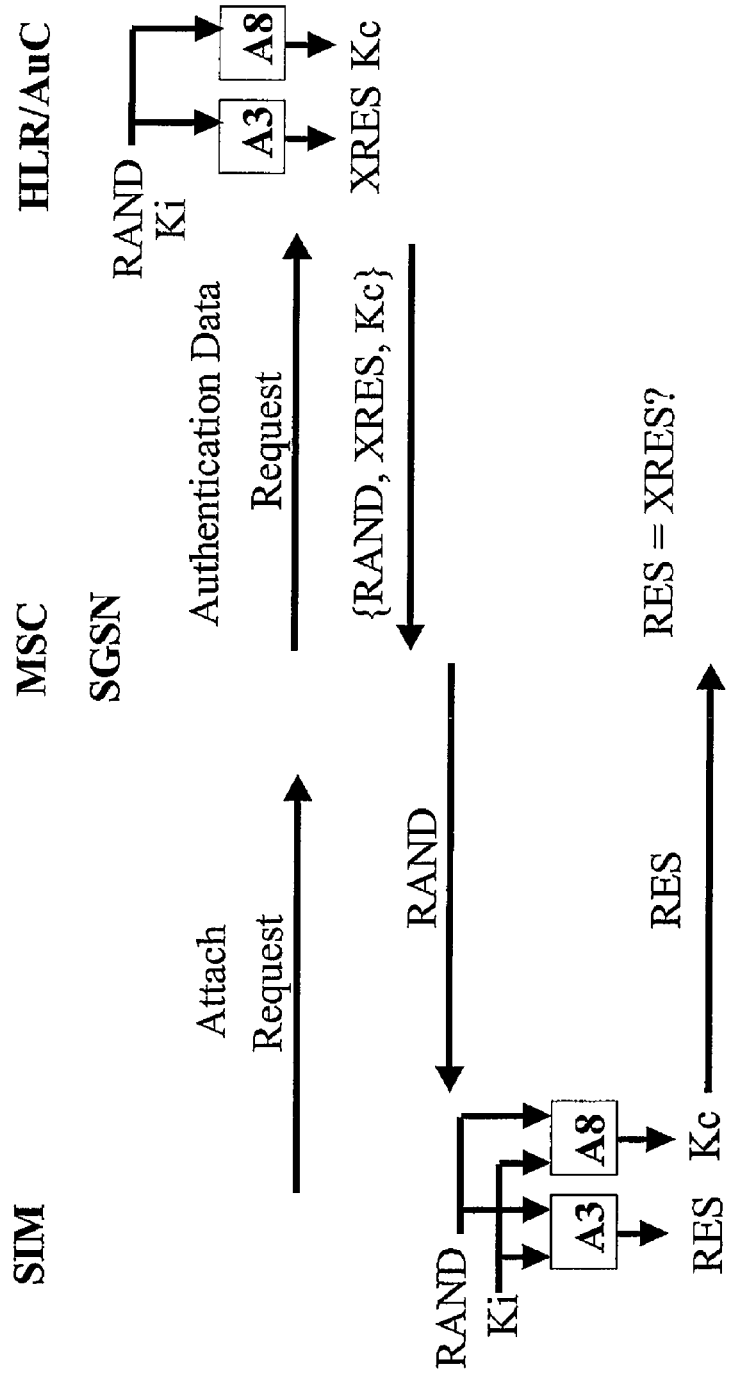
FIG. 6 illustrates the authentication and key agreement (AKA) protocol in a prior art GSM system.

FIG. 6 illustrates in more detail the authentication process according to the GSM standard. The MSC, in response to receiving an attach request, initiates a request for authentication data from the HLR/AuC. A random number generator at HLR/AuC generates a value RAND that is input to the A3/A8 algorithms whereby an expected response XRES and a cipher key $K_C$ are generated. The triplet RAND, XRES, and $K_C$ are returned to the MSC node that forwards the RAND value to the mobile station SIM-card. Corresponding calculations are performed at the mobile station that returns to the MSC a calculated response RES. All calculations use a secret key $K_i$ that is common for the mobile station and the network. By comparison of the RES and the XRES values the MSC can authenticate the mobile station.

Figure 7:
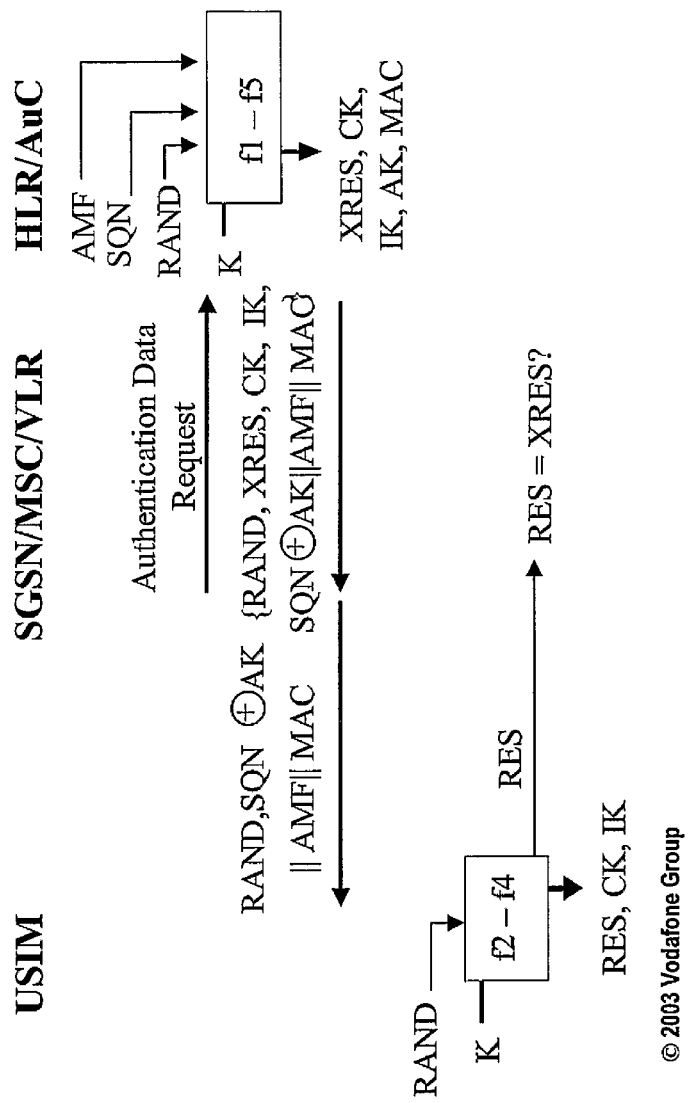
FIG. 7 illustrates the authentication and key agreement (AKA) protocol in a prior art UMTS system.

Basically, the same steps are performed in a UMTS system as shown in FIG. 7. However, there are additional parameters exchanged between the network and the mobile station in order to improve security. Thus, HLR/AuC, that includes a sequence number generator for generating a number SQN, calculates a quintet comprising the values XRES, CK, IK, AK, and MAC. These entities have been explained before but the message authentication code MAC is generally calculated over SQN||RAND||AMF and used by the mobile station to authenticate the network. The sequence number SQN can be used to prevent replay attacks. As can be seen from FIG. 7 the MSC returns, in this case, the values RAND, AMF, SQN, and MAC. Based on a common shared secret key K and the received RAND, the mobile station, or more particularly the USIM, uses the algorithms f2 to f4 to calculate RES, CK and IK. The value RES is returned and used to authenticate the mobile station as in the previous GSM case. The USIM also uses the algorithm f5 to calculate AK based on RAND, and retrieves SQN by use of the calculated anonymity key. AK is an anonymity key used to conceal the sequence number as the latter may expose the identity and location of a user. The concealment is to protect against passive attacks only, and if no concealment is desired then f5 does not have to be used. The mobile terminal uses f1 to verify the MAC. The mobile terminal also verifies that the received SQN number is in the correct range, usually by comparison with the current SQN number stored in the identity module USIM.

In a first aspect of the invention, a 2G terminal such as a GSM terminal or equivalent basic security standard terminal, is provided with improved security functionality according to the invention and located in a 3G VLR/SGSN and 2G or 3G BSS network, and wherein the HLR/AuC is modified to support the improved security according to the invention.

Figure 8:
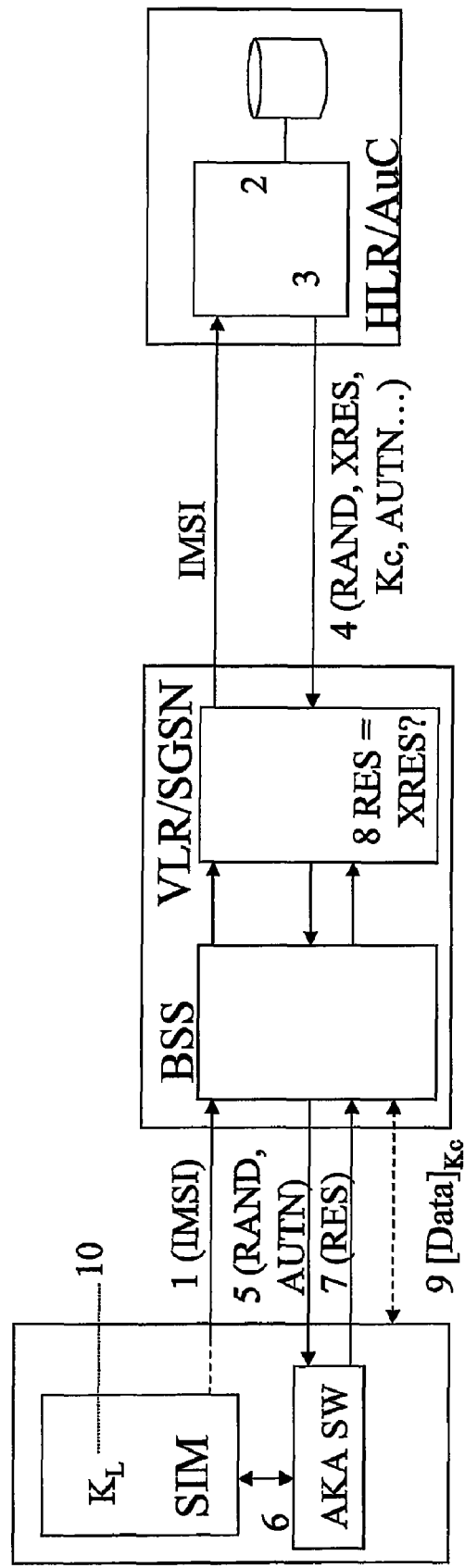
FIG. 8 illustrates schematically a preferred embodiment of the invention and typical signal exchange.

FIG. 8 shows the invention according to an exemplary preferred embodiment. Among other things, steps 3 and 6 in FIG. 8 are new, and step 2 is modified according to the invention. For instance, step 6 shows interaction between the 2G identity module (typically a GSM SIM) and a software module AKA SW according to the invention. The software module AKA SW, which is loaded into the mobile station during an initial provisioning phase, comprises executable software implementing functions for improved security, in particular for emulating an identity module according to a second security standard, here exemplified by an improved security standard that at least in part corresponds to 3G (UMTS) mobile communication standard. The AKA SW module can be loaded over the air according to, e.g., OTA standards or otherwise loaded at resale of the mobile station using any suitable interface, e.g. cable, infrared, or Bluetooth™. In the home network, which may be a modified 2G or 3G HLRJAuC, step 2 typically includes interrogation of suitable register(s) to determine whether the 2G terminal has been upgraded with the software module that basically emulates a USIM. The HLR/AuC is upgraded to execute a security algorithm to provide security data according to the second security standard, including RAND, XRES, AUTN and session keys in step 3.

As an optional but often preferred feature, as indicated in step 10, an enabling code $K_L$ is verified before initiating the emulation of the USIM capabilities. The enabling code $K_L$ is exemplary stored in the SIM card for enabling the interaction between the SIM card and the inventive AIA SW module. As a first step, the AKA SW can check the enabling code and, if not available, stop execution. The enabling code $K_L$ can, exemplary, be provided by use of the SIM-Toolkit environment for storing in the SIM module or in other cases simply be stored in the mobile terminal outside the identity module. The enabling code is typically a simple flag that is set to indicate that the terminal has the required software upgrade.

According to FIG. 8, the international mobile subscriber number, IMSI, is typically included in the attach request signal at step 1 and forwarded by the VLR/SGSN to the HLR/AuC that can use this information for determining, in step 2, the type of security support implemented at the mobile station.

Figure 9:
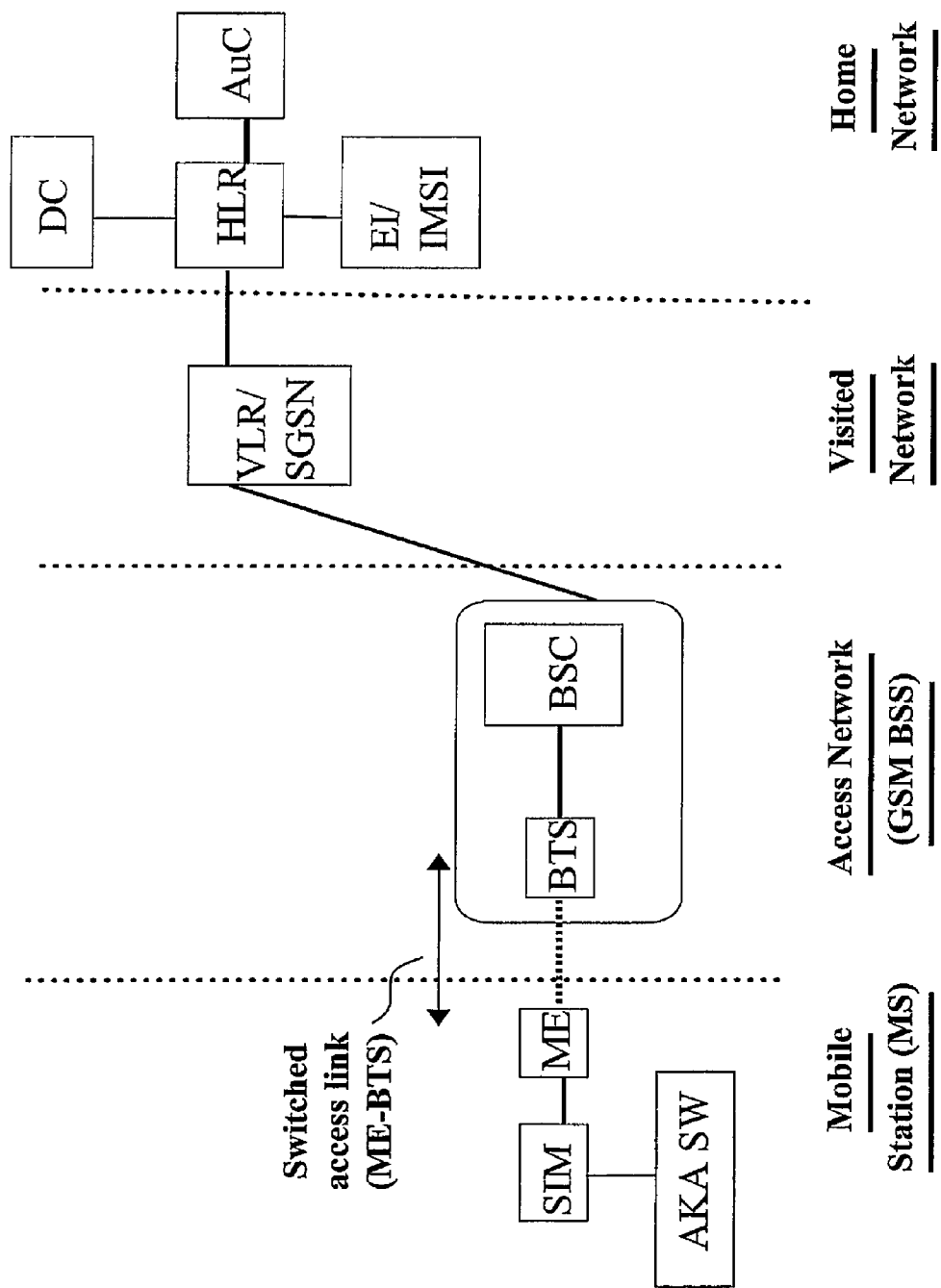
FIG. 9 is a schematic system overview according to an exemplary embodiment of the invention.

Exemplary, FIG. 9 illustrates a system overview according to an exemplary embodiment of the invention wherein the HLR/AuC interrogates a register EI/IMSI for determining equipment type EI corresponding to the IMSI value, assuming that the IMSI can serve as an identifier for the mobile terminal, implying that the subscriber does not move his SIM to another mobile too often. For practical purposes, this is a reasonable assumption. The EI value is then used for interrogating a device capability register DC for the mobile terminal security support. The EI/IMSI register can be maintained updated through use of, for example, a device management system that interrogates the terminal exemplary at attach request about terminal capabilities. Exemplary, HLR/AuC determines that the mobile station has implemented the inventive security improvement AKA SW, e.g. as illustrated in FIG. 8. HLR/AuC then performs the security calculations corresponding to the improved AKA SW algorithm and returns the calculated values to the VLR/SGSN for transparent forwarding to the mobile station.

Preferably, the improved security comprises network authentication data AUTN returned, together with the ordinary RAND, XRES and Kc, to the VLR/SGSN as illustrated in step 4 of FIG. 8. The RAND and AUTN are transferred all the way to the mobile terminal, as indicated by step 5. In a preferred embodiment, the values RAND and AUTN are transferred to the mobile terminal transparently to the visited network. For the case of 3G VLR/SGSN and 2G BSS, this is indeed supported by the 3GPP standardization described in reference [5]. In the case of 3G VLR/SGSN and 3G BSS, support is implicit by registering the mobile as a 2G terminal capable of UMTS AKA.

The mobile station is capable of identifying the RAND and AUTN values, and uses them as input to the AKA software module, which in step 6 interacts with the 2G SIM to emulate a 3G USIM. Preferably, the capabilities of the emulated USIM include support for mutual authentication and calculation of session keys. Authentication of the terminal is typically performed by transferring a RES to the VLR/SGSN in step 7 for verification in step 8. Protected communication can then be performed in step 9 using one or more of the calculated session keys.

It is also possible to use the invention, including the inventive modifications on the home network side and mobile terminal side described above, together with other configurations of the visited network such as 2G MSCNVLR and BSS.

Indeed, if GSM would, at some time, be enhanced by integrity protection over the radio interface, the present invention makes a key, IK, available for this purpose.

Even if the mobile terminal registers itself as a 2G terminal in a 2G visited network, the HLR/AuC may according to an exemplary embodiment of the invention transfer AUTN and similar security data according to the improved security standard embedded in a signalling format according to the basic 2G (GSM) standard to the mobile terminal. For example, AUTN and similar security data can be encoded or embedded into the ordinary AKA information such as RAND. In this way, the improved security parameters, are transparently transferred via the visited network embedded in the normal authentication challenge RAND. The mobile terminal is then configured to extract the AUTN and similar security data from the transferred RAND value, and can then apply both RAND and AUTN to the inventive AKA software module.

Figure 10:
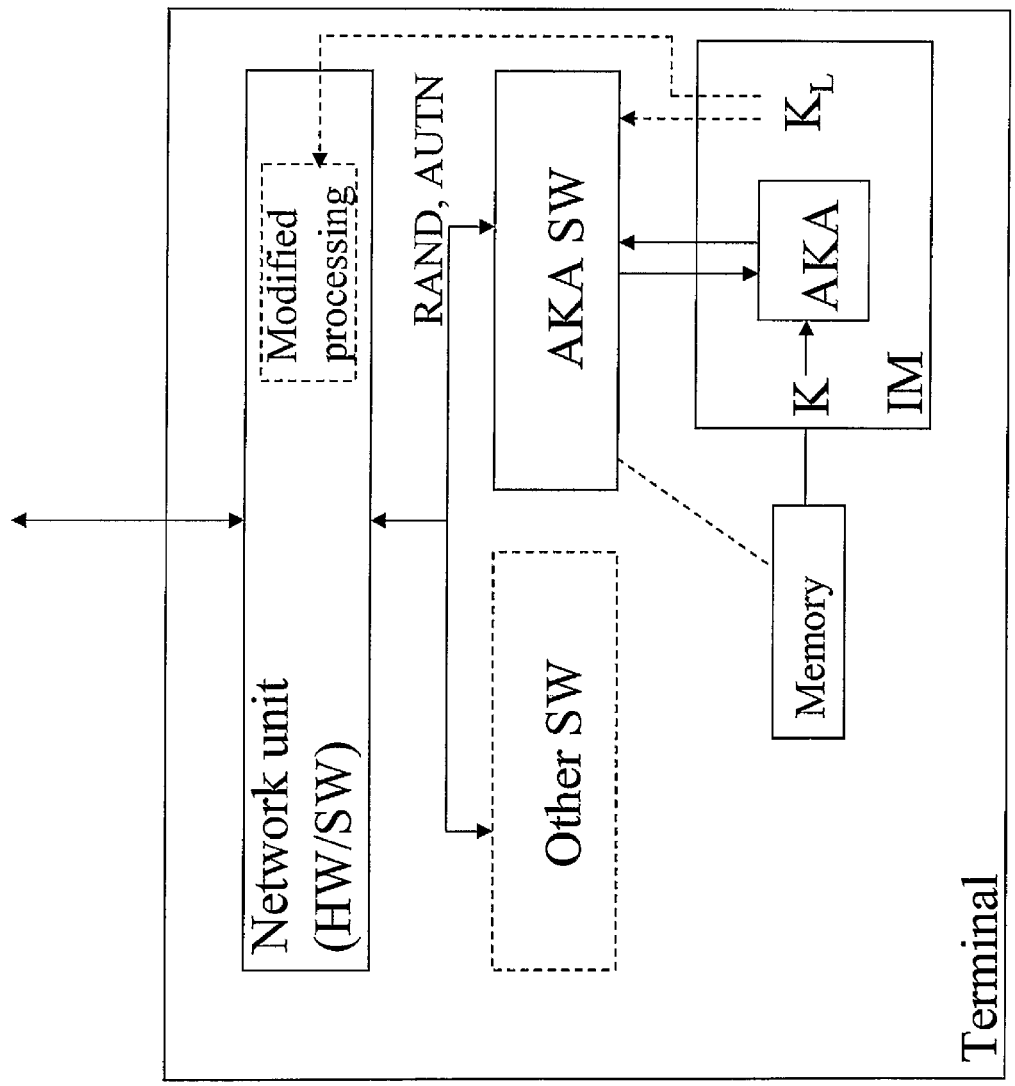
FIG. 10 shows in more detail an exemplary mobile terminal according to the invention.

An exemplary modified mobile station is illustrated in FIG. 10. A network unit, preferably implemented in combined hardware and software, includes a unit for modified processing. The values RAND and AUTN are identified in RAND' and forwarded to the inventive AIA SW module. The AKA SW module interacts with the identity module, e.g. a SIM identity module, for implementation of the improved security algorithm. A secret key K is the basis for the AKA algorithms. An enabling code $K_L$, also mentioned in FIG. 8, is used to enable interaction between the identity module IM and the AKA SW software program. Further shown in FIG. 10 is a memory for storing certain parameter values required for the security calculations such as the r and c parameters defined in the Milenage algorithm. These set of parameters are preferably at least characteristic of the mobile terminal, or characteristic of the SIM if they are stored in the SIM Toolkit. The mobile terminal is normally provisioned with these parameters in connection with the loading of the software upgrade of the invention, and the HLR/AuC can freely select a unique set of parameters to each mobile terminal being provisioned with the software.

The memory may be included in part as mobile station hardware or in part in the identity module IM e.g. using SIM Toolkit to insert values into a SIM module.

Figure 11:
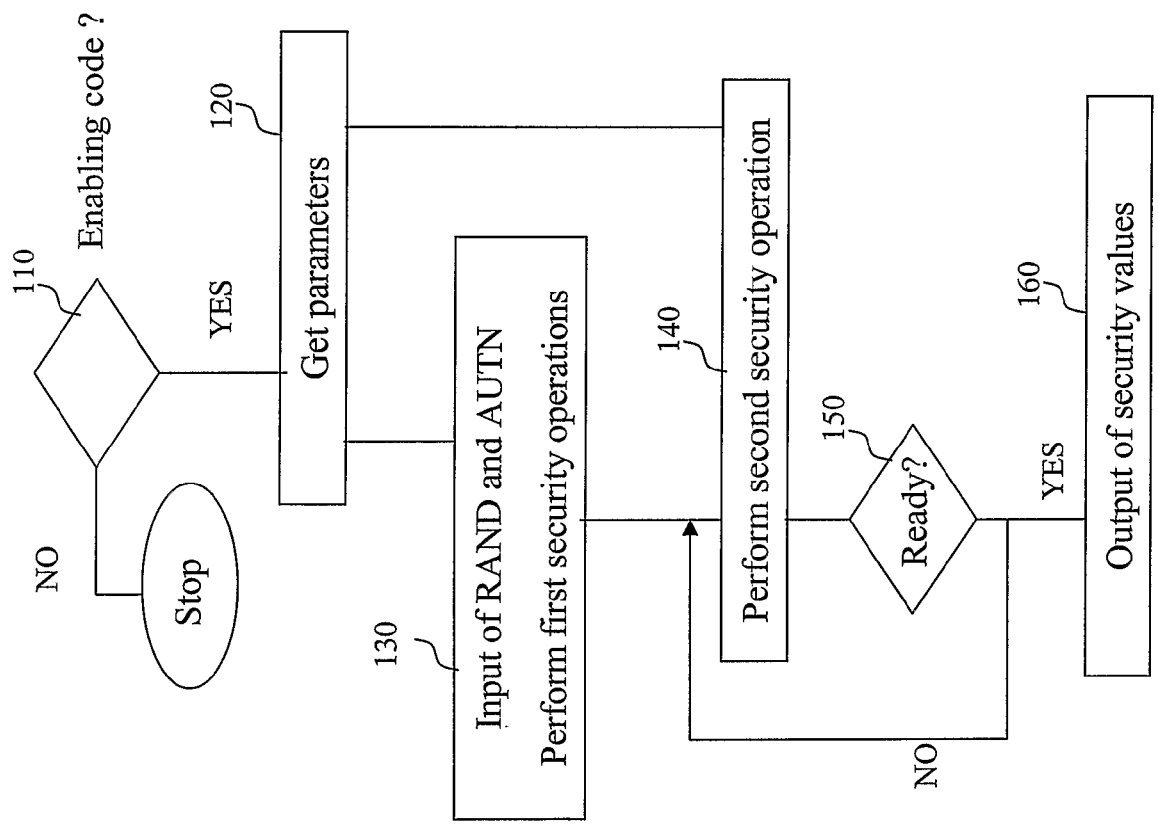
FIG. 11 is a flow chart illustrating an implementation of the invention in a mobile terminal.

FIG. 11 shows a flow chart illustrating the steps when executing the improved security algorithm according to an exemplary preferred embodiment of the invention. At 110 a check is made that the enabling code $K_L$ is available for enabling SIM-AKA SW interaction. If the key is not active the execution stops. Alternatively, a fall-back to basic GSM-AKA could be done. At 120 parameters are retrieved from storage locations. The parameters can be stored at storage locations available at the mobile station or, alternatively, inserted into the SIM card e.g. by means of the tool SIM Toolkit at delivery of the card or, otherwise, by transfer over the air. At 130 RAND is input to a first operation using at least a parameter. At 140 a second security operation is performed a preset number N of times. Each cycle of the second operation involves use of a selected subset of the parameters and execution of a routine $R_K$. At 150 a check is made that the second operation has been completed. At 160 calculated security values are output. Exemplary output from the calculations comprise a key for performing authentication of the network, a response RES, a cipher key CK and an integrity key IK.

In one embodiment of the invention a message authentication code, MAC, is calculated over AMF using said key for performing authentication, exemplary using the $f_1$ function known from the UMTS standard. AUTN comprises, in this case, AMF∥MAC.

According to one embodiment the AUTN data also includes a sequence number SQN generated at the HLR/AuC. Introduction of SQN allows protection against replay attacks. Thus, in this case AUTN=(SQN XOR AK)∥AMF∥MAC (where the anonymity key AIK may be omitted if anonymity is not an issue). The SQN number can be stored at the mobile station in the memory shown in FIG. 10 e.g. as a static variable of the SIM AKA software. Evidently, synchronization is lost if the identity module is moved to another device requiring a re-synchronization. This means that the first authentication in each new terminal can be subject to replay attacks, but consecutive authentications from one and the same terminal are protected. Alternatively, in order to maintain synchronization if the identity module is moved to another device, an application environment in the identity module, e.g. the SIM application toolkit, can be used to let the identity module register the sequence number.

In a particular embodiment, the first operation involves a call to the GSM SIM module for calculation of a temporary key $K_C$ and a temporary RES corresponding to the ordinary response in the basic GSM AKA authentication. According to this embodiment, a first choice of $R_K$ is the AKA algorithm and each execution of the routine, consequently, involves a call to the SIM module. At least some of the calls to the SIM module use said temporary key or derivatives thereof. It is noticed that GSM SIM requires an input of length 128 bits. The first call to GSM SIM uses RAND that fulfills this requirement. However, to fulfill the requirement in all second (iterated) operations the output from SIM in the first call is first processed to form k=$K_C$∥RES that is 96 bits long (64+32). The remaining 32 bits can comprise a series of zeroes, exemplary appended to the least significant part of k. It is apparent that there are numerous other ways to generate the missing 32 bits, including repeating bit patterns, applying hash functions and so fortli. It is noticed that the temporary RES is never exposed, and thus k has 96 bit entropy, which is significantly better than the 64 bits available in $K_C$ though slightly less than the 128 bits that are available in a true UMTS AKA system.

Figure 12:
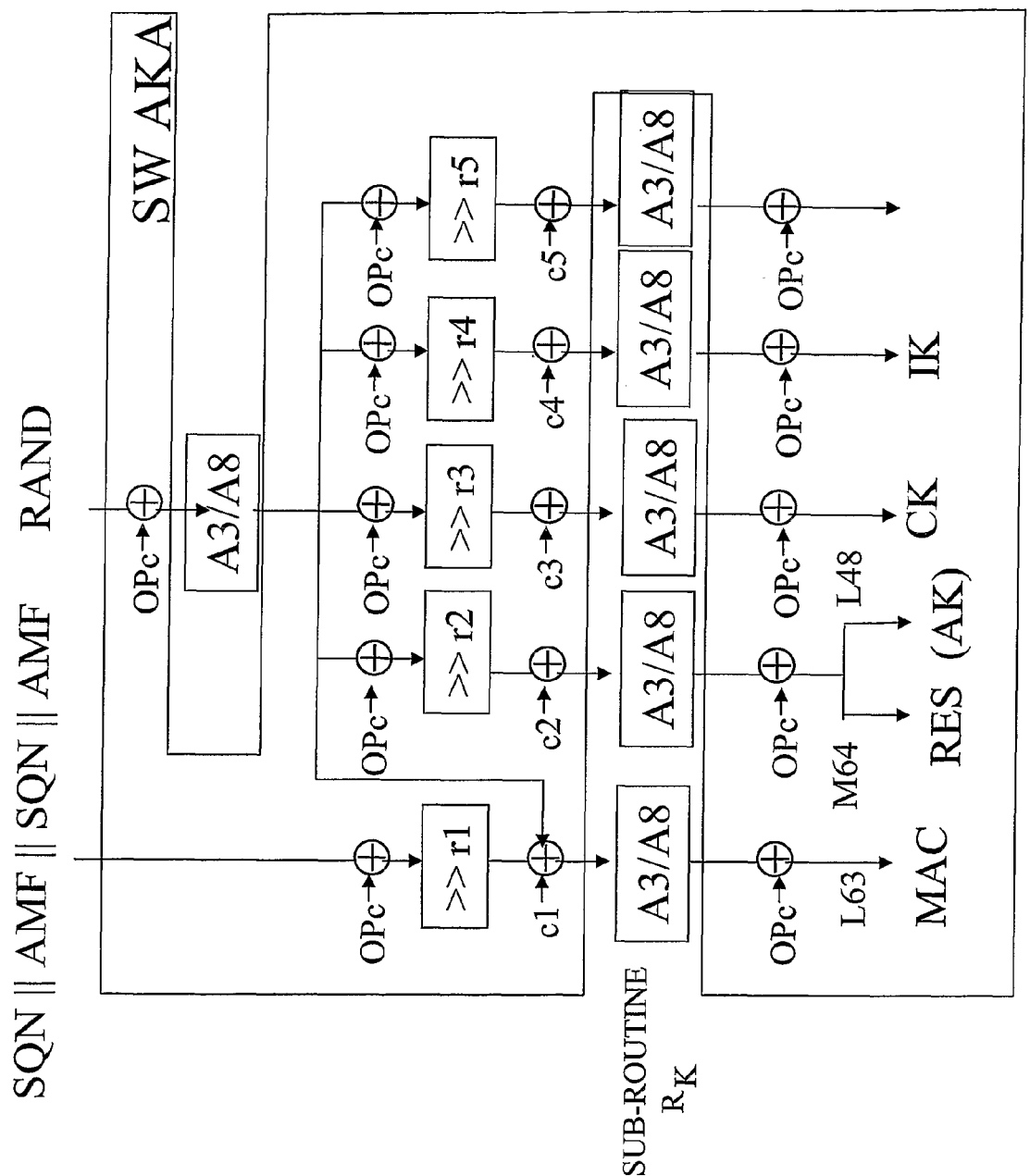
FIG. 12 illustrates interaction between a software program and an identity module according to an exemplary embodiment of the invention.

FIG. 12 illustrates this particular embodiment. All entities inside the frame form part of the software according to the invention. This arrangement is similar to FIG. 5 and the structure, thus, basically corresponds to the Milenage algorithm or corresponding UMTS f-set of algorithms.

According to said particular embodiment, a second choice of $R_K$ is the AES algorithm keyed by the temporary key $K_C$ or a derivative thereof, e.g. k'=$K_C$∥RES or some other key. It is observed, that in the latter embodiment there is only one call to the SIM module whereby valuable time is saved because the procedure call to the SIM module requires more time than execution of e.g. an AES algorithm implemented in software.

It is well known from prior art standards that the network informs the mobile station about preferred encryption algorithms that can be used, e.g. selection of A5 algorithm in GSM. In one embodiment of the invention, this information is advantageously included in the AMF field, supplied from the home network of the mobile subscriber. Thus, according to this embodiment, this data receives some integrity protection through the MAC code that is based on the AMF field. Assume the possible algorithms are enumerated in some way, e.g. A5/1=1, A5/2=2, . . . ; GEA1=x, GEA2=x+1, . . . . The home network HLR/AuC can signal that the algorithm number "j" is allowed if and only if the bit number "j" of AMF is set to one. It is noticed that if some attacker modifies AMF this will result in the mobile terminal computing the wrong response RES and the access network will detect this. This embodiment, therefore, improves over GSM standard according to which said data is transmitted in clear text. Another advantage of this solution is that RAND maintains 128 bits randomness whereas solutions have been proposed, e.g. reference [3], wherein some bits of RAND have been used for this signaling thereby decreasing randomness.

The mobile station may be arranged to use the AMF data as follows. The selection of algorithm to use is made, as generally known from prior art GSM standard, through a cipher mode command by the access network. This signal is not integrity protected in GSM. However, by comparing with the "implicitly" integrity-protected list of allowable algorithms, provided through AMF, selection of an algorithm not on the list can easily be detected by the mobile station. All an attacker can do is to change one allowed (secure) algorithm into another allowed (and secure) choice. Although the AMF has, in this embodiment, been used for information related to selection of algorithm it is readily understood that also other types of data can be included and obtain the same protection.

Referring again to FIG. 12 another embodiment includes use of a masking function to obtain a masked version of the SIM algorithm A3/A8. Thus, if $f$ is a one-way function, the output of GSM AKA is calculated as $f$(GSM_AKA) where GSM_AKA exemplary represents output values RES or $K_C$.

It can be expected that the network nodes in the access network and the home network respectively have different versions, some supportive of GSM and some supportive of UMTS. For instance, when a UMTS mobile station is in a GSM access network, certain parameter conversions are needed if the HLR/AuC delivers UMTS parameters. For instance, the GSM ciphering key, Kc, is computed in this case as Kc=CK1 XOR CK2 XOR IK1 XOR IK2, where CK1, CK2, IK1, IK2 are the 64 low/high order bits of the CK key respectively the IK key. The present invention can, however, be implemented in such environments considering that exactly the same conversion functions can be used. The general interoperability conversions that are performed in various scenarios can be found in reference [5].

In another embodiment, the present invention can be used to provide for additional services, ones that would normally require additional types of identity modules, available to a user without the need to plug-in these additional identity modules. As an example, 3GPP IP Multimedia Subsystem (IMS) is based on a so-called ISIM. The ISIM could for instance be implemented on UICC (next to the USIM), or use a completely different hardware module. According to the invention, ISIM is emulated using a software upgrade in the terminal, configured for communication with the ordinary identity module such as a SIM.

Figure 13:
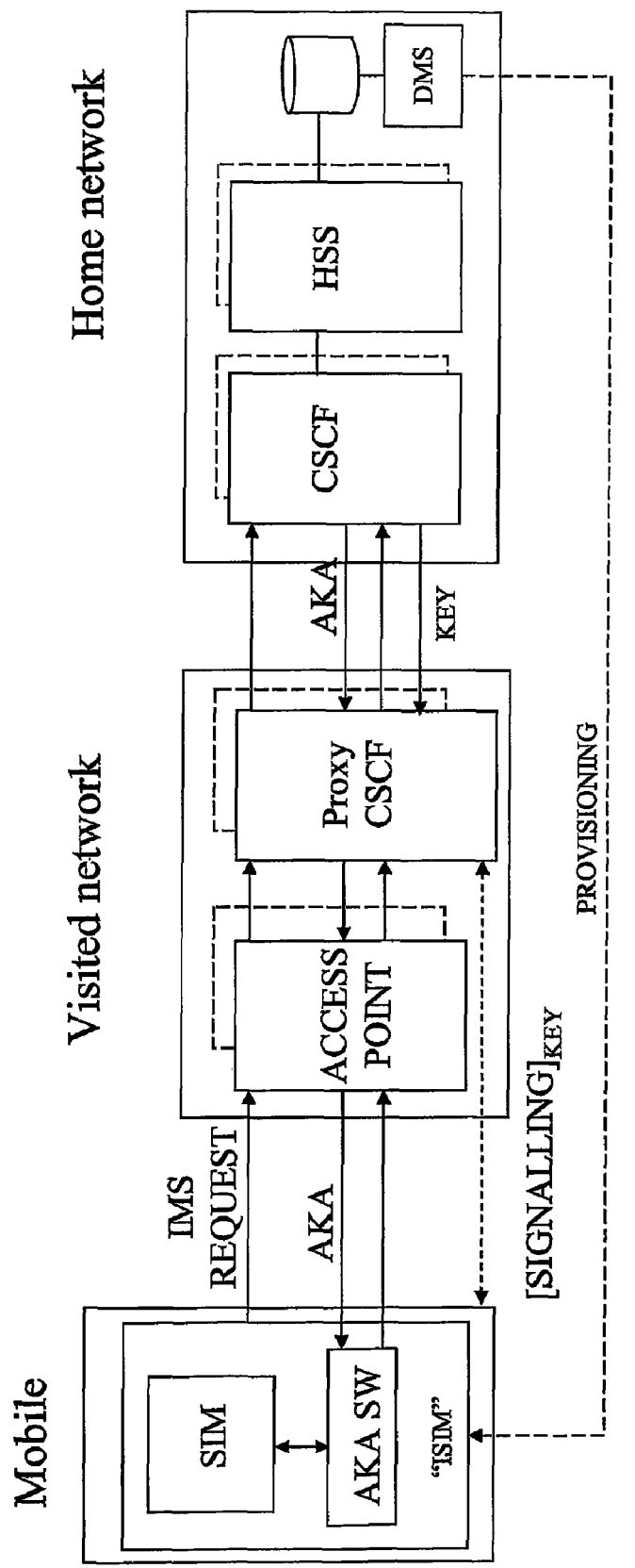
FIG. 13 illustrates schematically another preferred embodiment of the invention.

With reference to FIG. 13, it can be seen that the invention is schematically illustrated in an IP Multimedia Sub-system (IMS) context. For an IP Multimedia sub-system, the Proxy CSCF (Call State Control Function) node corresponds to the security-enabling node in the visited network. The HSS (Home Subscriber System) node provides the required authentication and key agreement parameters and the Serving CSCF in the home network normally authenticates IMS subscribers. For more information on IMS AKA signalling and implementation, reference is made to [8]. In the IMS context, the inventive AKA software in the mobile terminal helps emulating an ISIM to provide access to the IMS services, and especially to support authentication and protection of subsequent IMS signalling between the mobile and the proxy CSCF in the visited network.

On each ISIM there is an IMPI (IMS Private Identity) that is used as a basis for identification in the user authentication process. When a user registers, the user also supplies a so-called IMPU (IMS Public Identifier) to inform which identifier that others can employ to get in contact with the user. The IMPU protects the IMPI from becoming public. Each IMPI may have one or more associated IMPU, and the HSS checks that the IMPU matches the IMPI. The new software in the mobile terminal is preferably configured for managing IMPI and IMPU identifiers.

If the operator has several HSS nodes, there is a mapping in the serving CSCF at incoming requests where it is determined which HSS that handles a certain IMS private identity (IMPI). This is normally done by means of the Service Location Function (SLF). Preferably, the operator assigns special IMPI to those users that have gained IP Multimedia service access by use of the 'soft ISIM' upgrade, and handles all such users by a dedicated HSS. The operator may for example use different naming schemes, one for ordinary ISIM and another for soft ISIM. By way of example, IMPI of the following type may be used:

user@soft_isim.operator.com to indicate that the terminal has been upgraded with the inventive AKA software and thus requires special processing in the HSS node. This means that it can be determined from the IMS name/identity that the terminal has the required soft ISIM upgrade.

The embodiments described above are merely given as examples, and it should be understood that the present invention is not limited thereto. Further modifications, changes and improvements which retain the basic underlying principles disclosed and claimed herein are within the scope of the invention.

REFERENCES

[1] Barkan, Biham, and Keller, "Instant ciphertext-only cryptanalysis of GSM encrypted communication", In proceedings of Crypto 2003, Lecture notes in computer science, Springer-Verlag.

[2] "Enhancements to GSM/UMTS AKA", 3GPP contribution S3-030542, 3GPP TSG SA WG3 Security, October, 2003.

[3] "Special Rand" 3GPP contribution S3-030588, 3GPP TSG SA WG3 Security, October, 2003.

[4] H. Haverinen and J. Salowey: "Extensible Authentication Protocol Metliod for GSM Subscriber Identity Modules (EAP-SIM)", draft-haverinen-pppext-eap-sim-13.txt, IETF (work in progress).

[5] 3GPP TR 31.900 V3.2.0 (2002-03) Technical Report, Technical Specification Group Terminals, "SIM/USIM Internal and External Interworking Aspects" (Release 1999).

[6] WO 2004/032557, Apr. 15, 2004.

[7] 3GPP TS 35.206 V4.0.0 (2001-04) Technical Specification Group Services and System Aspects.

[8] RFC 3310, "Hypertext Transfer Protocol (HTTP) Digest Authentication Using Authentication and Key Agreement".

The invention claimed is:

1. A mobile terminal for operation in a mobile communications system, said mobile terminal having an identity module operative according to a first basic security standard, the mobile terminal comprising:
a network unit for executing an executable program stored in said mobile terminal and configured to interact with said identity module for emulating an identity module according to a second improved security standard in response to security data from a security node in said mobile communications system to support improved security for protected communication between the mobile terminal and the mobile communications system network side, wherein
the executable program is provisioned by a device management system.

2. The mobile terminal according to claim 1, wherein said first basic security standard corresponds to the GSM standard and said second improved security standard at least in part corresponds to the UMTS standard.

3. The mobile terminal according to claim 1, wherein said executable program is configured to emulate a UMTS Subscriber Identity Module (USIM) by a SIM to enable network service access.

4. The mobile terminal according to claim 1, wherein said executable program is configured to emulate an ISIM (IP Multimedia SIM) by a SIM to enable IP Multimedia System service access.

5. The mobile terminal according to claim 1, wherein said mobile terminal comprises means for verifying an enabling code before initiating the emulation of said identity module according to said second improved security standard.

* * * * *

UNITED STATES PATENT AND TRADEMARK OFFICE
CERTIFICATE OF CORRECTION

PATENT NO. : 7,933,591 B2  
APPLICATION NO. : 11/570186  
DATED : April 26, 2011  
INVENTOR(S) : Blom et al.

Page 1 of 1

It is certified that error appears in the above-identified patent and that said Letters Patent is hereby corrected as shown below:

On Page 2, in Field (56), under "OTHER PUBLICATIONS", in Column 1, Line 3, delete "Biriam" and insert -- Biham --, therefor.

In Column 2, Line 8, delete "AIA" and insert -- AKA --, therefor.

In Column 4, Line 60, delete "modem" and insert -- modern --, therefor.

In Column 9, Line 18, delete "HLRJAuC," and insert -- HLR/AuC, --, therefor.

In Column 9, Line 29, delete "AIA" and insert -- AKA --, therefor.

In Column 10, Line 20, delete "MSCNVLR" and insert -- MSC/VLR --, therefor.

In Column 10, Line 43, delete "AIA" and insert -- AKA --, therefor.

In Column 11, Line 26, delete "AIK" and insert -- AK --, therefor.

In Column 11, Line 56, delete "fortli." and insert -- forth. --, therefor.

Signed and Sealed this  
Twenty-seventh Day of September, 2011

David J. Kappos  
*Director of the United States Patent and Trademark Office*